United States Patent [19]

Murphy

[11] Patent Number: 4,982,988

[45] Date of Patent: Jan. 8, 1991

[54] SIDE PANEL CLAMP MECHANISM

[75] Inventor: Patrick M. Murphy, Lake Orion, Mich.

[73] Assignee: Mif-Sud Industries, Inc., Sterling Heights, Mich.

[21] Appl. No.: 259,917

[22] Filed: Oct. 19, 1988

[51] Int. Cl.$^5$ .............................................. B66C 1/22
[52] U.S. Cl. ................................. 294/81.61; 294/88; 294/104; 901/37
[58] Field of Search ............. 294/104, 901, 88, 103.1, 294/106, 67.31, 81.51, 81.61; 414/732, 736, 738, 739, 740, 753; 901/36, 37, 39

[56] References Cited

U.S. PATENT DOCUMENTS

| | | | |
|---|---|---|---|
| 1,822,629 | 9/1931 | McIlvried | 294/67.31 X |
| 3,610,676 | 10/1971 | Richner | 294/116 |
| 4,588,070 | 5/1986 | Smith | 294/104 X |
| 4,696,501 | 9/1987 | Webb | 294/103.1 X |

Primary Examiner—Margaret A. Focarino
Assistant Examiner—Dean J. Kramer
Attorney, Agent, or Firm—Remy J. VanOphem

[57] ABSTRACT

A plate gripper mechanism attachable to a robotic arm structure for transferring a sheet metal plate to or from a work station, e.g., stamping press, welding machine, milling machine, rivet machine, etc. The gripper mechanism utilizes a small commercially available fluid motor actuator in direct drive connection with a rotary shaft in the gripper mechanism, whereby the mechanism is relatively small and light. The mechanism is preferably constructed from bar stock, plate and tube stock; no special castings, stampings or forgings are used in preferred practice of the invention.

28 Claims, 3 Drawing Sheets

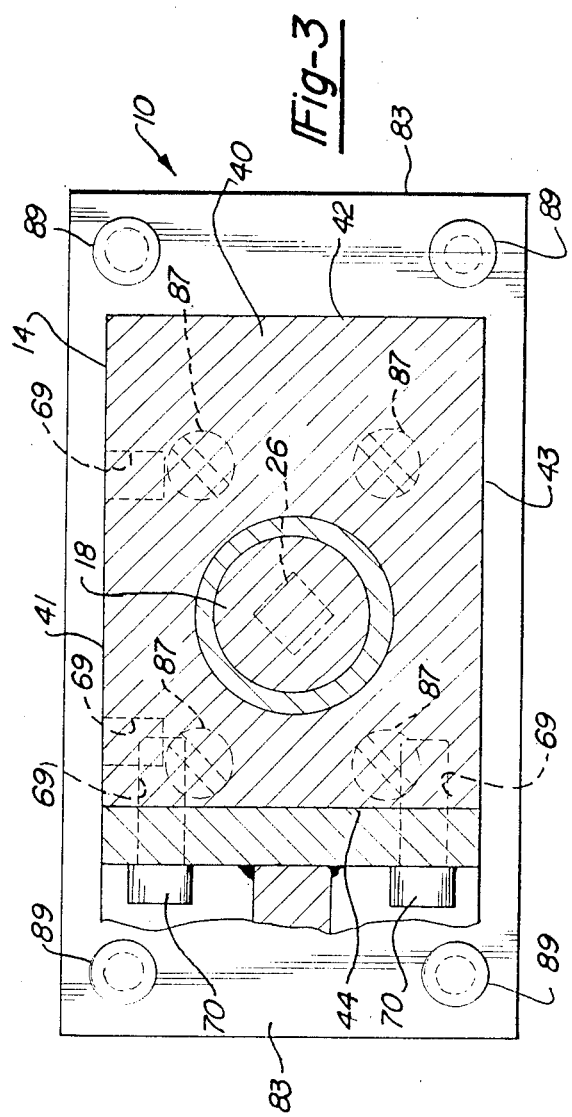
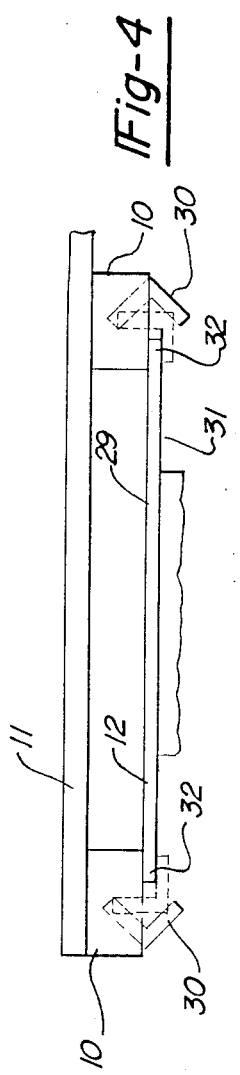

SIDE PANEL CLAMP MECHANISM

BACKGROUND OF THE INVENTION

1. Field Of The Invention

This invention relates to a side panel clamp mechanism adapted to grip an edge area of a metal plate or other workpiece so that the plate can be moved from place to place or manipulated into or out of a machining mechanism, such as a stamping press. The improved gripper mechanism can be carried on a robotic arm or other transfer device designed to move the gripper mechanism bodily from place to place.

2. Description Of The Prior Art

Various other types of plate gripper mechanisms are known. U.S. Pat. No. 4,448,056 to Baba shows a plate gripper mechanism wherein a fluid cylinder 130 is connected to a cam mechanism 116 for operating a movable jaw 104 between an unclamped position and a clamped position engaged with a workpiece W. The mechanism has a relatively long dimension along the axis of the cylinder 130. It is, therefore, difficult for this mechanism to move into or out of small clearance spaces.

U.S. Pat. No. 3,497,255 to Sindelar shows a gripper mechanism for gripping a workpiece W. The mechanism includes a fluid cylinder 14 having a slidable member 17 linked to a jaw 28 for gripment of the workpiece W. This mechanism is somewhat similar to the mechanism in U.S. Pat. No. 4,448,056 in that overall length of the mechanism is relatively great in a direction parallel to the axis of the fluid cylinder.

U.S. Pat. No. 4,752,094 to Tabeau shows a robotic gripping device wherein a piston 19 moves within a fluid cylinder to rotate a shaft 23 via a toothed rack 20. A work gripment jaw 42 is carried on the shaft. The mechanism shown in this patent utilizes a specially designed fluid cylinder actuator, which would be fairly expensive if produced in small volume quantities.

The Danly Machine Corporation of Chicago, Ill. manufactures a plate gripper mechanism wherein an air cylinder is connected to the shaft of a swingable jaw member via a pin-slot connection. The piston rod of the air cylinder is connected to a linear guide having two spiral slots in its inner surface. A rotary shaft is disposed within the linear guide so that a transverse pin extends from the shaft into two spiral slots. As the piston moves in the air cylinder the spiral slots exert cam actions on the end areas of the transverse pin to rotate the shaft around its axis, thereby producing a swinging motion of the associated jaw. The mechanism has a relatively long length in the direction of the rotary shaft. Also, the mechanism utilizes special castings which would be relatively expensive when produced in small volume quantities. This type of gripper mechanism provides limited output and is subject to degradation of the output force due to eventual wear of the spiral slots in the shaft.

SUMMARY OF THE INVENTION

The invention relates to a side panel gripper mechanism wherein a jaw or lifter arm is attached to a rotary shaft that is directly connected to a rotary fluid motor. The mechanism is designed to have a relatively small overall dimension along the shaft axis. Also, the mechanism is designed to utilize a commercial off the shelf fluid motor having a relatively small overall size and high torque output, whereby the associated lifter arm is able to exert a relatively strong clamping force on the metal plate or other workpiece being gripped by the gripper mechanism.

One object of the invention is to provide a side panel gripper mechanism having a relatively small overall size.

Another object of the invention is to provide a gripper mechanism that is relatively light in weight, such that the mechanism can be carried on the free end of a long length robotic arm structure without overloading the arm structure or requiring the arm structure to have a thick beefed-up cross-section in order to carry the weight of the gripper mechanism.

A further object of the invention is to provide a plate gripper mechanism that can be formed or manufactured without using specially stamped components, castings or forgings that might require special tooling or long lead times for part procurement.

The invention contemplates a gripper mechanism that is formed out of commercially available parts, such as bar stock, plates or tube stock.

A further general object of the invention is to provide a gripper mechanism that can be manufactured in small volume quantities using conventional machining practices. It is a further object of the invention to avoid the use of high cost tooling or special manufacturing equipment that would excessively add to the manufacturing cost of small volume quantities.

These and many other objects and features of the invention will become more apparent upon a reading of the following detailed description in conjunction with the drawings appended hereto.

BRIEF DESCRIPTION OF THE DRAWINGS

FIG. 3 is a sectional view taken along line 3—3 in FIG. 1; and

FIG. 4 is a schematic illustration showing how the improved gripper mechanism can be connected to a transfer device to transport a metal sheet from one place to another.

DETAILED DESCRIPTION OF THE PREFERRED EMBODIMENTS

Figure 1:
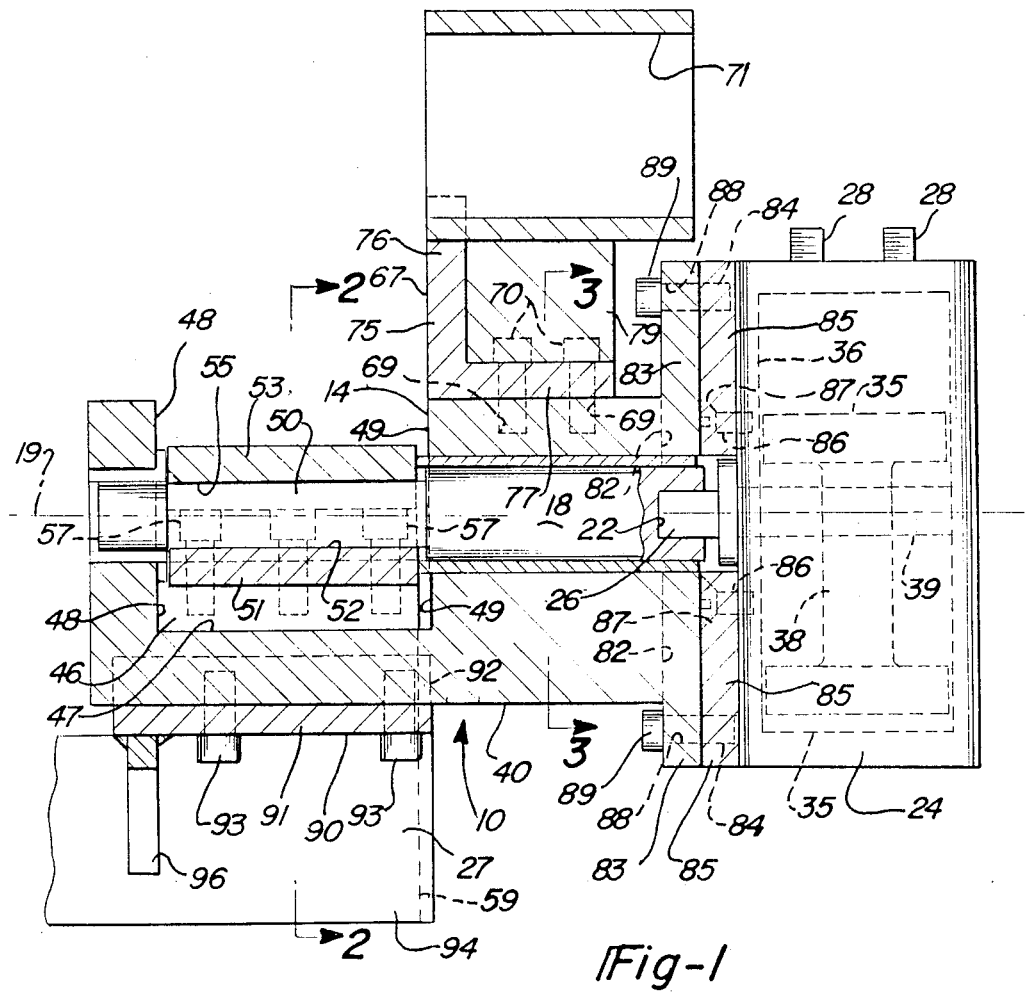
FIG. 1 is a sectional view taken along line 1—1 in FIG. 2, and illustrating one form that the invention can take.

FIG. 4 shows two side plate clamp gripper mechanisms 10 suspended or otherwise attached to an overhead bar structure 11 for gripping of a sheet metal plate 12. Each gripper mechanism includes a pivotable lifter arm 30 designed to be swung into engagement with the edge 32 of the undersurface 31 of the plate 12 to exert a clamp action thereon. The bar structure 11 would be connected to a non-illustrated power device for moving the bar structure and, hence, the clamped plate 12. The invention is primarily directed to the construction of a gripper mechanism 10, as shown more particularly in FIGS. 1, 2 and 3.

The gripper mechanism 10 of FIG. 1 includes a rotary fluid motor 24 attached to a carrier body 14. The carrier body has an elongated rectangular block structure 40 having side faces 41, 42, 43, and 44. An end face 82 of the block structure 40 is welded or otherwise permanently secured to a face plate 83. As best seen in FIG. 3, the face plate 83 has a greater face area than the block structure 40 such that peripheral face areas of the face plate extend laterally beyond the block side faces 41, 42, 43 and 44. The peripheral face areas of the face plate are, thus, usable to affix the carrier body 14 to the fluid motor 24.

The fluid motor 24 has attachment openings that are spaced closer together than the profile dimension of the block structure 40. Therefore, it is necessary to provide an adapter plate 85 between the fluid motor 24 and the face plate 83. The adapter plate 85 has a set of openings 86 that accommodate screws 87 for securing the adapter plate to the base surface of the fluid motor 24. The adapter plate 85 has a second set of threaded openings 84 alignable with openings 88 in the aforementioned face plate 83, whereby screws 89 can be extended through the openings 88 into the threaded openings 84 to secure the face plate 83 to the adapter plate 85. In this manner, the carrier body 14 is attached to the fluid motor 24 even though the attachment openings in the fluid motor are within the profile dimension of the block structure 40. The aforementioned fluid motor 24 has a circular piston 35 movable back and forth in a cylinder 36. The intermediate section of the piston 35 is cut away to form a toothed rack 38. A corresponding section of a square male rotary output member 26 is formed with gear teeth 39 thereon, whereby linear motion of the piston is translated into rotary motion of the square male output member 26. Pressurized air is emitted to opposite ends of the cylinder 36 via threaded fittings 28. The fluid motor 24 is preferably a commercially available motor obtainable from the Dynaquip Controls Co. of Fenton, Mo.

Formed in the elongated block structure 40 is a rectangular groove 46 cut transversely through the block at right angles to the axis 19 of a rotary shaft 18, to define a flat rear groove face 47 extending parallel to the shaft axis 19 and two groove side faces 48 and 49 extending normal to the shaft axis. The rotary shaft 18 extends through the groove 46 so that circular areas of the shaft on both sides of the groove are supported by the elongated block structure 40. The aforementioned lifter arm 30 is attached to the shaft in the space defined by the groove 46 so that the lifter arm can swing in a plane between and parallel to the groove side faces 48 and 49.

Figure 2:
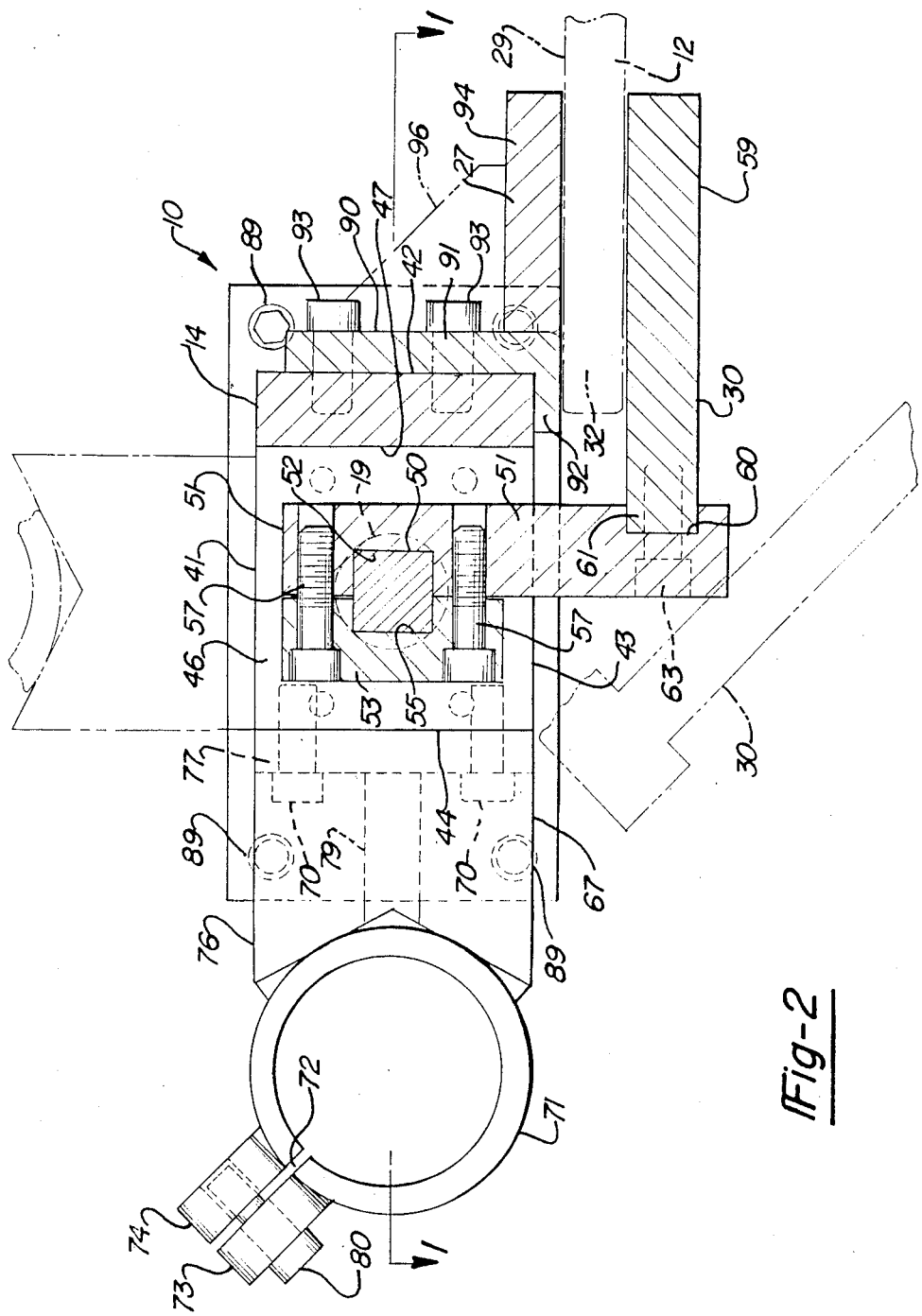
FIG. 2 is a sectional view taken along line 2—2 in FIG. 1.

The lifter arm 30 includes a flat plate 51 having a flat surface recess 52 extending therealong. As seen in FIG. 2, the recess 52 fits around approximately one-half the perimeter of the square cross-sectioned shaft area 50. A retainer bar 53 has a second flat surface recess 55 extending therealong to fit around the remaining half of the square cross-section shaft area 50. Bolts 57 extend through openings in the retainer bar 53 and plate 51 to ri%idly clamp the lifter arm 30 to the shaft 18.

Adjacent its lower end, the plate 51 has a rectangular slot 60 in one of its faces. An additional flat plate 59 is arranged with an edge area 61 snugly fitted into the slot 60, as shown in FIG. 2. Bolts 63 extend through the slotted zone of the plate 51 into the edge area of the plate 59 to rigidly connect the two plates together.

As seen in FIG. 1, the width of the groove 46 is approximately one-half the total length of the block structure 40. The block area to the right of the groove 46 serves as a suspension point for the block structure, i.e., the point from which the block structure is suspended from the overhead bar structure 11 (FIG. 4) or other robotic arm system. A suspension bracket 67 is attached to the side face 44, as shown in FIGS. 1 and 2. The suspension bracket has an angle member 75 which has a leg 77 positioned against the block side face 44 and a leg 76 extending at a right angle to the leg 77. Bolts 70 extend through the leg 77 into threaded openings 69 in the block to rigidly but detachably connect the angle member 75 to the block structure. A reinforcement plate 79 is welded to the legs 76 and 77 to form an attachment surface for a tubular element 71. The tubular element 71 has a circular cross-section, as best seen in FIG. 2. Opposed arms 73 and 74 are welded to the tubular element 71 at the split 72 in the tubular element. Pressure applying screws 80 extend through openings in the opposed arms to provide a means for tightening the tubular element 71 onto a non-illustrated rod-like support member. This arrangement enables the gripper mechanism 10 to be suspended from a support structure. Also the gripper mechanism can be adjustably mounted for rotary adjustment around the axis of the tubular element 71. Additionally, the mechanism can be adjusted to a limited extent along the axis of the tubular element 71.

In FIG. 3 additional openings 69 in the side face 41 of the block 40 are shown. These additional openings provide an alternate mounting mechanism for the aforementioned suspension bracket 67. Thus, the suspension bracket can be attached to either the face 44 or the face 41 of the block structure 40, as might be most appropriate for a particular application of usage of the gripper mechanism.

A clamp structure 27 is shown in detail in FIG. 2. The clamp structure includes ar L-shaped bar 90 having a leg 91 abutted against the side face 42 of the block structure 40 and a second leg 92 abutted against the side face 43 of the block structure. Bolts 93 extend through the leg 91 to secure the bar 90 to the block structure 40. A thickened plate 94 is welded to the L-shaped bar 90 so that the lower face of the plate 94 is in planar alignment with the lower face of the second leg 92. The clamp structure is designed to engage an upper face 29 of the sheet metal plate 12. The lifter arm 30 is swingable from the dash line position in FIG. 2 to the full line position in FIG. 2 to exert a lifter force on the plate 12, to thereby tightly clamp the plate between the lifter arm and the clamp structure. The clamp structure 27 may be reinforced by a gusset 96 suitably welded to the plate 94 and the L-shaped bar 90. As seen in FIG. 1, the plate 94 extends leftwardly beyond the gusset 96. The associated plate 59 on the lifter arm 30 extends leftwardly a corresponding distance, as required for any particular usage or installation. The clamp structure 27 is detachable from the block structure 40 to permit different clamp structure configurations to be selectively utilized with a given block structure construction.

The gripper mechanism shown in FIGS. 1, 2, and 3 is formed out of easily available materials, i.e., flat plates, bar stock or tube stock. Conventional machining operations can be utilized to form the component parts. Welding operations can be utilized to connect the permanently connect the components. Many of the components are detachably connected so that alternate component constructions can be selectively or interchangeably used, as required to meet particular customer needs.

FIG. 4 shows one particular arrangement wherein two gripper mechanisms 10 are arranged at opposite edge areas of the sheet metal plate 12. The component parts in the mechanisms 10 are left-handed and right-handed. However, the structure shown in FIGS. 1, 2 and 3 is designed to be symmetrical such that many of the components can be used for both the left-handed and right-handed positions. In this regard, the block structure 40 is constructed to be symmetrical about a longitudinal plane extending through the shaft axis 19 and normal to the rear face 47 of the groove 46, such that the block structure 40 can be used interchangeably in gripper mechanisms at opposite side edges of any given sheet metal plate 12.

The FIG. 1 gripper mechanism advantageously uses a conventional fluid motor 24 having a minimum dimension along the axis of the shaft 18. The overall size of the gripper mechanism is relatively small. Also, the mechanism is relatively light in weight. Accordingly, the gripper mechanism can be located on the free end of a robotic arm structure without unduly overloading the structure. The shaft 18 has a direct drive connection by the use of a square female cavity 22 with the square male rotary output member 26, such that there are no sliding or frictional engagements that could cause premature wear during normal service.

The drawings show one particular form that the invention can take. However, it will appreciated that other forms can be utilized while still practicing the invention.

Having, thus, described the present invention by way of an exemplary embodiment, it will be apparent to those skilled in the art that many modifications may be made from the exemplary embodiment without departing from the spirit of the present invention or the scope of the claims appended thereto.

What is claimed is:

1. A gripper mechanism adapted to tightly grip the edge areas of a sheet metal plate so that the plate can be lifted from a horizontal position and manipulated into different positions, said gripper mechanism comprising:
   a carrier body having a motor attachment face disposed at one end thereof;
   a shaft rotatably extending through said carrier body normal to said motor attachment face, said shaft having a non-circular drive in proximity to said motor attachment face;
   a motor mountable on said motor attachment face of said carrier body, said motor having an extending rotary output member directly connected to said non-circular drive of said shaft, whereby motor rotation causes said shaft to rotate about an axis of rotation;
   a stationary clamp structure attached to said carrier body engageable with an upper face of said sheet metal plate to be lifted; and
   a lifter arm structure attached to said shaft and rotatable therewith in a plane normal to said axis of rotation to engage an undersurface of said sheet metal plate and clamp said sheet metal plate between said lifter arm structure and said stationary clamp structure.

2. A gripper mechanism adapted to grip edge areas of a sheet metal plate so that the sheet metal plate may be lifted from a horizontal position, said gripper mechanism comprising:
   a carrier body having a shaft bore provided therethrough and a motor attachment face transverse to said shaft bore;
   a shaft having an axis of rotation rotatably disposed in said shaft bore, said shaft extending through said carrier body and having a non-circular drive provided at the end adjacent to said motor attachment face;
   a fluid motor attached to said motor attachment face having a rotary output member detachably connected to said non-circular drive of said shaft, said fluid motor having a piston reciprocable in a cylinder in a direction normal to said axis of rotation, said piston having a toothed rack engaging a gear attached to said rotary output member, said gear translating the linear motion of said piston and said toothed rack to a rotary motion of said rotary output member;
   a stationary clamp structure attached to said carrier body and extending therefrom in a direction normal to said axis of rotation, said stationary clamp structure being engageable with an upper surface of said sheet metal plate; and
   a lifter arm structure attached to said shaft and rotatable therewith in a plane normal to said axis of rotation to engage an undersurface of said sheet metal plate and clamp said sheet metal plate between said lifter arm structure and said stationary clamp structure.

3. The gripper mechanism of claim 2 wherein said non-circular drive comprises a non-circular female socket provided in an end surface of said shaft and said rotary output member has a mating non-circular male member receivable in said female socket.

4. The gripper mechanism of claim 2 wherein said carrier body comprises an elongated rectangular block having four flat side faces extending parallel to said shaft axis.

5. The gripper mechanism of claim 4 wherein said elongated rectangular block has a rectangular groove cut transversely therethrough to define a flat groove rear face extending parallel to said axis of rotation and two groove side faces extending normal to said axis of rotation; said shaft extending through said rectangular groove so that areas of said shaft on both sides of said rectangular groove are supported by said elongated rectangular block; said lifter arm structure being attached to said shaft in the space defined by said groove.

6. The gripper mechanism of claim 5 wherein the area of said shaft within said rectangular groove has a square cross-section; and said lifter arm structure further comprises a first flat plate having a flat surface recess therealong adapted to fit around approximately one-half the perimeter of said square cross-sectioned shaft area, and a retainer bar having a second flat surface recess therealong adapted to fit around the remaining half of said square cross-sectioned shaft area.

7. The gripper mechanism of claim 6 further comprising bolt means extending through said retainer bar into said first flat plate to rigidly clamp said lifter arm structure onto said shaft.

8. The gripper mechanism of claim 6 wherein said lifter arm structure further comprises:
   an additional flat plate normal to said first flat plate;
   said first flat plate having a rectangular slot in one of its faces, said additional flat plate having an edge area thereof extending into said rectangular slot in said first flat plate; and
   bolts extending through the slotted zone of said first flat plate into said edge area of said additional plate to rigidly connect said first flat plate and said additional plates together.

9. The gripper mechanism of claim 5 wherein said elongated rectangular block is symmetrical about a longitudinal plane containing said axis of rotation and normal to said flat groove rear face of said rectangular groove, whereby said elongated rectangular block can be used interchangeably in gripper mechanism at opposite side edges of any given sheet metal plate.

10. The gripper mechanism of claim 5 wherein said rectangular groove is cut into said elongated rectangular block at a point remote from said motor attachment face, wherein the block section between said rectangular groove and said motor serves as the suspension point for said carrier body.

11. The gripper mechanism of claim 10 further comprising a suspension bracket detachably connected to a side face of said elongated rectangular block at a point between said rectangular groove and said motor.

12. The gripper mechanism of claim 11 wherein two side faces of said elongated rectangular block have similarly spaced threaded openings therein, whereby said suspension bracket can be selectively attached to either of said two side faces.

13. The gripper mechanism of claim 11 wherein said suspension bracket includes a tubular element split on an axial line, opposed arms extending outwardly from said tubular element along edge areas defined by said split in said tubular element, and pressure applying screws extending through said opposed arms to tighten said tubular element around a rod-like support member for said gripper mechanism.

14. A gripper mechanism adapted to grip edge areas of a sheet metal plate so that the sheet metal plate may be lifted from a horizontal position, said gripper mechanism comprising:
an elongated rectangular carrier body having a shaft bore provided therethrough, a motor attachment face transverse to said shaft bore, four flat side faces extending parallel to said shaft bore, and a rectangular groove cut through said carrier body transverse to said shaft bore, said rectangular groove having a rear face parallel to said shaft bore and two side faces extending normal to said shaft bore;
a shaft having an axis of rotation rotatably disposed in said shaft bore and extending through said carrier body and said rectangular groove, said shaft having a non-circular drive provided at the end adjacent to said motor attachment face;
a motor attachable to said motor attachment face having a rotary output member detachably connected to said non-circular drive of said shaft, said motor being operable to rotate said shaft about said axis of rotation;
a stationary clamp attached to said carrier body and extending therefrom in a direction normal to said axis of rotation, said stationary clamp being engageable with an upper surface of said sheet metal plate; and
a lifter arm attached to said shaft in the space defined by said rectangular groove and rotatable with said shaft in a plane normal to said axis of rotation to engage an undersurface of said sheet metal plate and clamp said sheet metal plate between said lifter arm and said stationary clamp.

15. The gripper mechanism of claim 14 wherein said carrier body comprises:
a face plate secured to said motor attachment face, and said face plate having a greater facial area than said motor attachment face providing peripheral face areas to which said motor may be attached to said carrier body.

16. The gripper mechanism of claim 15 further comprising an adapter plate attachable to said motor to enable said motor to be affixed to said face plate.

17. The gripper mechanism of claim 16 wherein said adapter plate has two sets of through openings, one set of through openings being alignable with a fastener opening on said motor, said other set of through openings being alignable with openings in peripheral areas of said face plate.

18. The gripper mechanism of claim 17 wherein said one set of openings in said adapter plate is located within the profile dimension of said motor attachment face of said elongated rectangular block, and said other set of openings in said adapter plate is located outboard from said profile dimension of said motor attachment face of said elongated rectangular block.

19. A gripper mechanism adapted to grip edge areas of a sheet metal plate so that the sheet metal plate may be lifted from a horizontal position, said gripper mechanism comprising:
an elongated rectangular carrier body having a shaft bore provided therethrough, a motor attachment face normal to said shaft bore, and four flat side faces extending parallel to said shaft bore;
a shaft having an axis of rotation rotatably disposed in said shaft bore, said shaft extending through said rectangular carrier body and having a non-circular drive provided at the end adjacent to said motor attachment face;
a motor attachable to said motor attachment face having a rotary output member detachably connected to said non-circular drive provided at said end of said shaft adjacent to said motor attachment face, said motor being operative to rotate said shaft through a predetermined angle about said axis of rotation;
a stationary clamp attached to said rectangular carrier body, said stationary clamp comprising an L-shaped bar having a first leg abutting against one side face of said rectangular carrier body, a second leg abutting against a second side face of said rectangular carrier body and bolts extending through said second leg of said L-shaped bar into said rectangular carrier body through said second side face; and
a lifter arm attached to said shaft and rotatable therewith in a plane normal to said axis of rotation to engage an undersurface of said sheet metal plate and clamp it between said first leg of said L-shaped bar and said lifter arm.

20. The gripper mechanism of claim 19 wherein said stationary clamp further includes a thickened flat plate having an edge thereof welded to said L-shaped bar in planar alignment with an exposed face of said second leg of said L-shaped bar.

21. The gripper mechanism of claim 20 wherein said clamp structure further comprises a gusset arranged at right angles to said thickened plate and said second leg of said L-shaped bar.

22. A gripper mechanism for edge areas of a sheet metal plate, comprising:
a carrier body having a motor attachment face at one end thereof and a groove cut transversely through said carrier body adjacent to the end of said carrier body opposite said motor attachment face;
a shaft rotatably extending through said carrier body normal to said motor attachment face;

a motor attached to said motor attachment face, said motor having a rotary output member directly connected to said shaft;

a stationary clamp structure attached to said carrier body in alignment with said transverse groove; and a lifter arm structure attached to said shaft within said transverse groove, said lifter arm structure being rotatable with said shaft to clamp an edge of said sheet metal plate to said clamp structure.

23. The gripper mechanism of claim 22 wherein the width of said transverse groove is approximately the same as the distance between said transverse groove and said motor attachment face.

24. The gripper mechanism of claim 23 further comprising a suspension bracket attached to said carrier body at a point between said transverse groove and said motor attachment face.

25. The gripper mechanism of claim 22 wherein said carrier body comprises a square cross-sectional block having four flat side faces extending parallel to said shaft axis, and a face plate welded to one end of said block to form said motor attachment face.

26. The gripper mechanism of claim 25 wherein said block has a length that is slightly greater than the width of said transverse groove.

27. The gripper mechanism of claim 25 wherein said shaft has an end surface located substantially in the plane of said motor attachment face.

28. A gripper mechanism adapted to grip edge areas of a sheet metal plate comprising:

a carrier body having at least a motor attachment face at one end thereof, a first side face and a second side face;

a shaft having an axis of rotation rotatably disposed through said carrier body with said axis of rotation normal to said motor attachment face;

a motor attachable to said motor attachment face having a rotary output member detachably connected to an end of said shaft adjacent to said motor attachment face and adapted to rotate said shaft therewith about said axis of rotation;

a stationary clamp comprising a bar having an angular cross section which includes a first leg abutting said first side face of said carrier body, a second leg abutting said second side face of said carrier body and a bolt means extending through said first leg into said carrier body; and a lifter arm attached to said shaft and rotatable therewith in a plane normal to said axis of rotation to engage an undersurface of said sheet metal plate and clamp said sheet metal plate between said stationary clamp and said lifter arm.

* * * * *

UNITED STATES PATENT AND TRADEMARK OFFICE
CERTIFICATE OF CORRECTION

PATENT NO. : 4,982,988

DATED : January 8, 1991

INVENTOR(S) : Patrick M. Murphy

It is certified that error appears in the above-identified patent and that said Letters Patent is hereby corrected as shown below:

Column 3, line 52, delete "ri%idly" and insert ---- rigidly ----.

Column 4, line 29, delete "ar" and insert ---- an ----.

Column 4, line 56, delete "connect the".

Signed and Sealed this

Nineteenth Day of May, 1992

Attest:

DOUGLAS B. COMER

*Attesting Officer*   *Acting Commissioner of Patents and Trademarks*